(12) United States Patent
Sun

(10) Patent No.: US 11,275,618 B2
(45) Date of Patent: Mar. 15, 2022

(54) METHOD, DEVICE AND MEDIUM FOR ALLOCATING RESOURCE BASED ON TYPE OF PCI DEVICE

(71) Applicant: ZHENGZHOU YUNHAI INFORMATION TECHNOLOGY CO., LTD., Henan (CN)

(72) Inventor: Xiuqiang Sun, Henan (CN)

(73) Assignee: ZHENGZHOU YUNHAI INFORMATION TECHNOLOGY CO., LTD., Henan (CN)

( * ) Notice: Subject to any disclaimer, the term of this patent is extended or adjusted under 35 U.S.C. 154(b) by 424 days.

(21) Appl. No.: 16/475,111

(22) PCT Filed: Dec. 26, 2018

(86) PCT No.: PCT/CN2018/123684
§ 371 (c)(1),
(2) Date: Jun. 30, 2019

(87) PCT Pub. No.: WO2019/237713
PCT Pub. Date: Dec. 19, 2019

(65) Prior Publication Data
US 2021/0357258 A1 Nov. 18, 2021

(30) Foreign Application Priority Data

Jun. 11, 2018 (CN) .......................... 201810594753.8

(51) Int. Cl.
*G06F 9/50* (2006.01)
*G06T 1/20* (2006.01)
(Continued)

(52) U.S. Cl.
CPC ........ *G06F 9/5011* (2013.01); *G06F 13/4022* (2013.01); *G06F 13/4221* (2013.01);
(Continued)

(58) Field of Classification Search
None
See application file for complete search history.

(56) References Cited

U.S. PATENT DOCUMENTS 6,311,242 B1 * 10/2001 Falkenburg ......... G06F 13/4081
345/503
6,516,374 B1 * 2/2003 Kinoshita ............. G06F 1/1632
710/302
(Continued)

FOREIGN PATENT DOCUMENTS

CN 101226515 A 7/2008
CN 103455379 A 12/2013
(Continued)

OTHER PUBLICATIONS

'PCI Express Base Specification Revision 1.0a' copyright PCI-SIG, Apr. 15, 2003. (Year: 2003).*
(Continued)

*Primary Examiner* — Steven G Snyder
(74) *Attorney, Agent, or Firm* — Yue (Robert) Xu; Apex Attorneys at Law, LLP

(57) ABSTRACT

A method, a device and a medium for allocating a resource based on a type of a PCI device are provided. In a case of running a BIOS program during a start-up process, information of a Switch chip captured by a PCI enumeration operation is acquired. It is determined whether the PCI device is connected to a GPU server based on the information of the Switch chip. An operation of allocating the PCI device with an IO resource is cancelled in a case that the PCI device is connected to the GPU server, and the PCI device is allocated with an IO resource and a memory resource based on a preset allocation rule in a case that the PCI device is not connected to the GPU server.

10 Claims, 3 Drawing Sheets

(51) Int. Cl.
*G06T 1/60* (2006.01)
*G06F 13/42* (2006.01)
*G06F 13/40* (2006.01)

(52) U.S. Cl.
CPC .................. *G06T 1/20* (2013.01); *G06T 1/60* (2013.01); *G06F 2213/0024* (2013.01)

(56) References Cited

U.S. PATENT DOCUMENTS

| | | | | |
|---|---|---|---|---|
| 6,704,808 | B2* | 3/2004 | Kasamatsu | G06F 1/1632 710/10 |
| 7,243,167 | B2* | 7/2007 | Zimmer | G06F 12/0223 710/10 |
| 8,312,257 | B2* | 11/2012 | Tabuchi | G06F 9/5011 713/2 |
| 8,719,483 | B2* | 5/2014 | Hidaka | G06F 13/4022 710/314 |
| 9,495,723 | B2* | 11/2016 | Currid | G06T 1/20 |
| 9,558,527 | B2* | 1/2017 | Sierra | G06T 1/20 |
| 10,019,778 | B2* | 7/2018 | Sierra | G06F 3/1438 |
| 10,657,076 | B2* | 5/2020 | Ho | G06F 13/126 |
| 10,824,581 | B2* | 11/2020 | Nash | G06F 13/4022 |
| 2002/0156945 | A1* | 10/2002 | Takada | G06F 9/5011 710/8 |
| 2007/0162624 | A1* | 7/2007 | Tamasi | G06F 13/387 710/8 |
| 2010/0241840 | A1 | 9/2010 | Tabuchi et al. | |
| 2011/0029693 | A1* | 2/2011 | Brinkmann | G06F 13/4234 710/8 |
| 2015/0042664 | A1* | 2/2015 | Currid | G06F 9/46 345/502 |
| 2016/0117793 | A1* | 4/2016 | Sierra | G06T 1/20 345/502 |
| 2017/0103495 | A1* | 4/2017 | Sierra | G06F 1/1632 |
| 2018/0373669 | A1* | 12/2018 | Nash | G06F 13/4282 |
| 2019/0317905 | A1* | 10/2019 | Ho | G06F 13/126 |
| 2019/0377953 | A1* | 12/2019 | Chatterji | G06K 9/00718 |
| 2020/0394076 | A1* | 12/2020 | Chan | G06F 9/5022 |

FOREIGN PATENT DOCUMENTS

| | | | | |
|---|---|---|---|---|
| CN | 108804230 A | | 11/2018 | |
| EP | 3223152 B1 | * | 8/2019 | ......... G06F 13/4282 |
| WO | WO-2019237711 A1 | * | 12/2019 | |

OTHER PUBLICATIONS

International Search Report for PCT/CN2018/123684 dated Mar. 28, 2019, ISA/CN.

* cited by examiner

METHOD, DEVICE AND MEDIUM FOR ALLOCATING RESOURCE BASED ON TYPE OF PCI DEVICE

This application is the national phase of International Patent Application No. PCT/CN2018/123684, titled "METHOD, DEVICE AND MEDIUM FOR ALLOCATING RESOURCE BASED ON TYPE OF PCI DEVICE", filed on Dec. 26, 2018, which claims the priority to Chinese Patent Application No. 201810594753.8, titled "METHOD, DEVICE AND MEDIUM FOR ALLOCATING RESOURCE BASED ON TYPE OF PCI DEVICE", filed on Jun. 11, 2018 with the Chinese Patent Office, both of which are incorporated herein by reference in their entireties.

FIELD

The present disclosure relates to the technical field of PCI devices, and in particular to a method, a device and a medium for allocating a resource based on a type of a PCI device.

BACKGROUND

PCI devices mainly use two types of resources, that is, the IO resource and the memory resource. A PCI device may be allocated with a certain resource according to an actual type of the PCI device. For example, a Super IO chip uses only the IO resource, and a PCI device such as a network card and a consuming-level graphics card may use both the IO resource and the memory resource.

In practice, in a case of running a BIOS program during a start-up process, the IO resource is limited to be a size of 64 k. However, during the process, each PCI device is allocated with an IO resource of 4 k, thus some PCI devices may not operate normally in a case that the number of the PCI devices is equal to or greater than 16. For example, if the PCI device is a graphics card, the graphics card may not operate normally. As can be seen, the above problem is caused by the requirement for a large amount of the IO resources. Further, the PCI device may not use any IO resource in some certain cases, for example, in a case that the PCI device is connected to a GPU server, thus it is unnecessary to allocate the PCI device with any IO resource.

Therefore, a problem to be solved urgently by those skilled in the art is how to ensure availability of a PCI device during resource allocation for the PCI device.

SUMMARY

A method, a device and a medium for allocating a resource based on a type of a PCI device are provided according to the present disclosure, to ensure availability of a PCI device during resource allocation for the PCI device.

To solve the above technical problem, a method for allocating a resource based on a type of a PCI device is provided according to the present disclosure. The method includes steps of:

acquiring information of a Switch chip captured by a PCI enumeration operation in a case of running a BIOS program during a start-up process;

determining whether the PCI device is connected to a GPU server based on the information of the Switch chip; and cancelling an operation of allocating the PCI device with an IO resource in a case that the PCI device is connected to the GPU server, or allocating the PCI device with the IO resource and a memory resource according to a preset allocation rule in a case that the PCI device is not connected to the GPU server.

Preferably, the information of the Switch chip includes ID information of the Switch chip and version information of the Switch chip.

The step of determining whether the PCI device is connected to the GPU server based on the information of the Switch chip includes:

determining whether there are the ID information of the Switch chip and the version information of the Switch chip; and determining, in a case that there are the ID information of the Switch chip and the version information of the Switch chip, that the PCI device is connected to the GPU server.

Preferably, before the step of determining whether the PCI device is connected to the GPU server based on the information of the Switch chip, the method further includes:

acquiring the number of the PCI device; and determining whether the number of the PCI device reaches a preset value.

In a case that the number of the PCI device reaches the preset value, the step of determining whether the PCI device is connected to the GPU server based on the information of the Switch chip is performed.

Preferably, the preset value is 16.

Preferably, the PCI device is a TitanV graphics card.

To solve the above technical problem, a device for allocating a resource based on a type of a PCI device is provided according to the present disclosure, which includes a first acquiring unit, a first determining unit, and an allocating unit. The first acquiring unit is configured to acquire information of a Switch chip captured by a PCI enumeration operation in a case of running a BIOS program during a start-up process. The first determining unit is configured to determine whether the PCI device is connected to a GPU server based on the information of the Switch chip. The allocating unit is configured to: cancel an operation of allocating the PCI device with an IO resource in a case that the first determining unit determines that the PCI device is connected to the GPU server, and allocate the PCI device with the IO resource and a memory resource according to a preset allocation rule in a case that the first determining unit determines that the PCI device is not connected to the GPU server.

Preferably, the information of the Switch chip includes ID information of the Switch chip and version information of the Switch chip.

The first determining unit is further configured to: determine whether there are the ID information of the Switch chip and the version information of the Switch chip; and determine, in a case that there are the ID information of the Switch chip and the version information of the Switch chip, that the PCI device is connected to the GPU server.

Preferably, the device further includes a second acquiring unit and a second determining unit. The second acquiring unit is configured to acquire the number of the PCI device. The second determining unit is configured to determine whether the number of the PCI device reaches a preset value, and trigger the first determining unit in a case that the number of the PCI device reaches the preset value.

To solve the above technical problem, a device for allocating a resource based on a type of a PCI device is further provided according to the present disclosure, which includes a memory and a processor. The memory is configured to store a computer program. The processor is configured to perform, when executing the computer program, the steps of the above-described method for allocating a resource based on a type of a PCI device.

To solve the above technical problem, a computer readable medium is further provided according to the present disclosure, which has a computer program stored thereon. The computer program, when executed by a processor, configures the processor to perform the steps of the above-described method for allocating a resource based on a type of a PCI device.

With the method for allocating a resource based on a type of a PCI device according to the present disclosure, in a case of running a BIOS program during a start-up process, information of a Switch chip captured by a PCI enumeration operation is acquired. The reason for performing the method in the case of running the BIOS program during the start-up process is that the IO resource is limited in the case of running the BIOS program, thus the method is used for allocating a resource to a PCI device only in the case of running the BIOS program during the start-up process. It is determined whether the PCI device is connected to a GPU server based on the information of the Switch chip. An operation of allocating the PCI device with an IO resource is cancelled in a case that the PCI device is connected to the GPU server, and the PCI device is allocated with an IO resource and a memory resource based on a preset allocation rule in a case that the PCI device is not connected to the GPU server. In the method, it is determined whether the PCI device is connected to the GPU server based on the information of the Switch chip, to determine whether it is required to allocate the IO resource. Compared with the conventional method for allocating a resource, with the method according to the present disclosure, in a case that the size of the IO resource is limited, an operation of allocating IO resources to certain PCI device may be cancelled, and it is ensured that all the PCI devices operate normally.

In addition, a device and a medium for allocating a resource based on a type of a PCI device are further provided according to the present disclosure, which correspond to the above method, and achieve the same technical effect.

BRIEF DESCRIPTION OF THE DRAWINGS

In order to describe the embodiments of the present disclosure more clearly, drawings to be used in the description of the embodiments are described briefly. It is apparent that the drawings described below only show some of embodiments of the present disclosure, those skilled in the art may obtain other drawings based on the drawings without any creative effort.

DETAILED DESCRIPTION

The technical solutions in the embodiments of the present disclosure are described clearly and completely hereinafter in conjunction with the drawings in the embodiments of the present disclosure. It is apparent that the described embodiments are some, rather than all of the embodiments of the present disclosure. Based on the embodiments of the present disclosure, all other embodiments, made by those skilled in the art without any creative efforts, should fall into the protection scope of the present disclosure.

A method, a device and a medium for allocating a resource based on a type of a PCI device are provided according to the present disclosure, to ensure the availability of the PCI device during resource allocation for the PCI device.

In order to make those skilled in the art better understand the technical solutions of the present disclosure, a detailed description of the present disclosure is made in conjunction with the drawings and the embodiments hereinafter.

Figure 1:
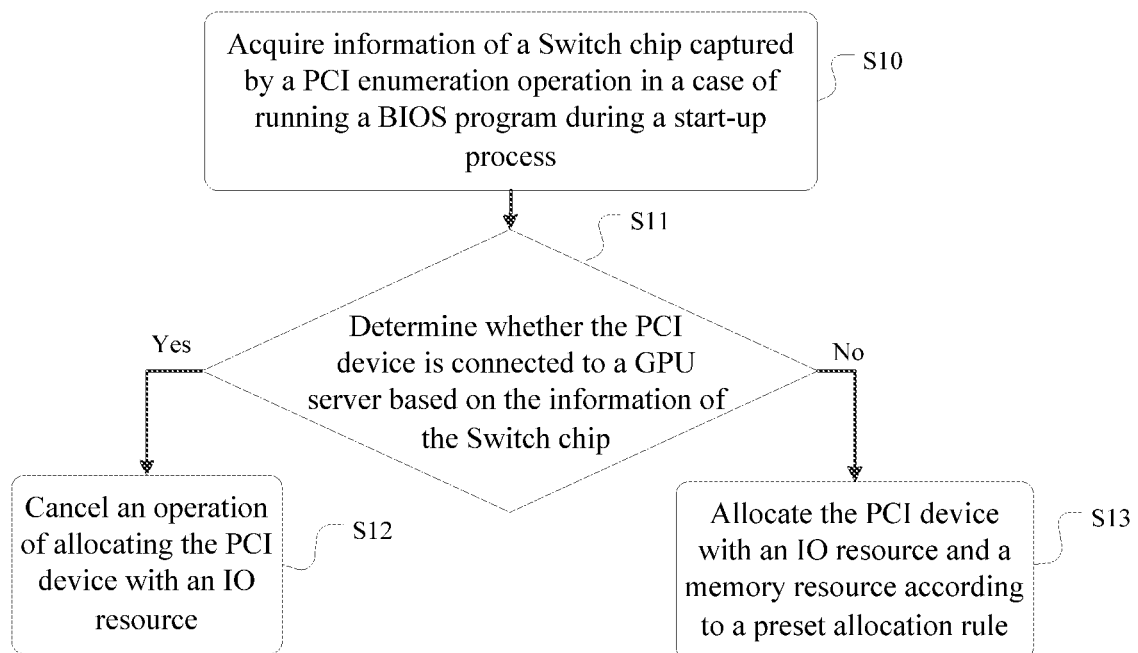
FIG. 1 is a flow chart of a method for allocating a resource based on a type of a PCI device according to an embodiment of the present disclosure.

FIG. 1 is a flow chart of a method for allocating a resource based on a type of a PCI device according to an embodiment of the present disclosure. As shown in FIG. 1, the method includes the following steps S10 to S13.

In step S10, in a case of running a BIOS program during a start-up process, information of a Switch chip captured by a PCI enumeration operation is acquired.

It is to be noted that, the BIOS program is embedded into a ROM chip on a motherboard of a computer or a server, which includes a basic input and output program, a self-checking program and a self-start program that are important to a computer or a server. The BIOS program mainly functions to provide a basic way to set and control the hardware. The type of the PCI device is not limited in the present disclosure, for example, the PCI device may be a TitanV graphics card.

It is required to run the BIOS program during a start-up process, in which a PCI enumeration operation is performed, that is, a screening operation is performed on the PCI devices in a system based on a screening condition. For a different operating system, a specific enumeration operation is performed. For example, unlike a Windows system, a Linux system does not have a function for directly enumerating a graphics card, thus information of the PCI device is acquired only by using a shell script or by accessing a configuration space of the PCI device. It is to be understood that, the PCI enumeration operation is already known in the conventional technology, which is well known by those skilled in the art, and detailed description is not repeated here.

In a specific embodiment, if the PCI device is connected to the GPU server, the information of the Switch chip is captured. That is, it is determined whether the PCI device is connected to the GPU server based on the information of the Switch chip.

In step S11, it is determined that whether the PCI device is connected to the GPU server based on the information of the Switch chip. The method proceeds to step S12 in a case that the PCI device is connected to the GPU server, or proceeds to step S13 in a case that the PCI device is not connected to the GPU server.

It is to be understood that, the GPU server includes a Switch chip. The number of the Switch chip is taken as the only standard of determining a type of the PCI device, such that it is determined how to allocate the IO resource and the memory resource. If information of no Switch chip is captured, it is indicated that the PCI device is not connected to the GPU server. If information of N Switch chips is captured, it is indicated that there are N PCI devices respectively connected to N GPU servers. It is to be noted that, a type of the Switch chip is not limited in the embodiment, and functions thereof may be referred to the conventional technology, which is not repeated here.

In a specific embodiment, the information of the Switch chip includes ID information and version information of the Switch chip.

Step S11 further includes: determining whether there are the ID information and the version information of the Switch chip, and determining that the PCI device is connected to the GPU server in a case that there are the ID information and the version information of the Switch chip.

In step S12, an operation of allocating the PCI device with an IO resource is cancelled.

In step S11, if it is determined that there are the ID information and the version information of the Switch chip, it is indicated that the PCI device is connected to the GPU server. In this case, the PCI device may operate normally without any allocated IO resource. Thus, the operation of allocating the PCI device with an IO resource is cancelled. It is to be understood that, in this step, only the operation of allocating the PCI device with an IO resource is cancelled, rather than indicating that an operation of allocating a memory resource is cancelled. It is determined whether to allocate the memory resource according to actual applications of the PCI device, which may be referred to the conventional technology and thus is not repeated here.

It is to be understood that, in a case that the PCI device is connected to the GPU server, the IO resource may be occupied, and a shortage of the IO resource in a case of running the BIOS is relieved.

In step S13, the PCI device is allocated with an IO resource and a memory resource according to a preset allocation rule.

In step S11, if it is determined that there is no ID information and version information of the Switch chip, it is indicated that the PCI device is not connected to the GPU server. In this case, the PCI device may not operate normally without an allocated IO resource. It is to be noted that, the preset allocation rule is set in advance. The preset allocation rule may be set with reference to the conventional technology, which is not repeated here.

With the method for allocating a resource based on a type of a PCI device according to the present disclosure, in a case of running a BIOS program during a start-up process, information of a Switch chip captured by a PCI enumeration operation is acquired. The reason for performing the method in the case of running the BIOS program during the start-up process is that the size of the IO resource is limited in the case of running the BIOS program, thus the method is used for allocating a resource to a PCI device only in the case of running the BIOS program during the start-up process. It is determined whether the PCI device is connected to a GPU server based on the information of the Switch chip. An operation of allocating the PCI device with an IO resource is cancelled in a case that the PCI device is connected to the GPU server, and the PCI device is allocated with an IO resource and a memory resource according to a preset allocation rule in a case that the PCI device is not connected to the GPU server. In the method, it is determined whether the PCI device is connected to the GPU server based on the information of the Switch chip, to determine whether it is required to allocate the IO resource. Compared with the conventional method for allocating a resource, with the method according to the present disclosure, in a case that the size of the IO resource is limited, an operation of allocating the IO resource to a certain PCI device may be cancelled, thereby ensuring normal operation of all the PCI devices.

Figure 2:
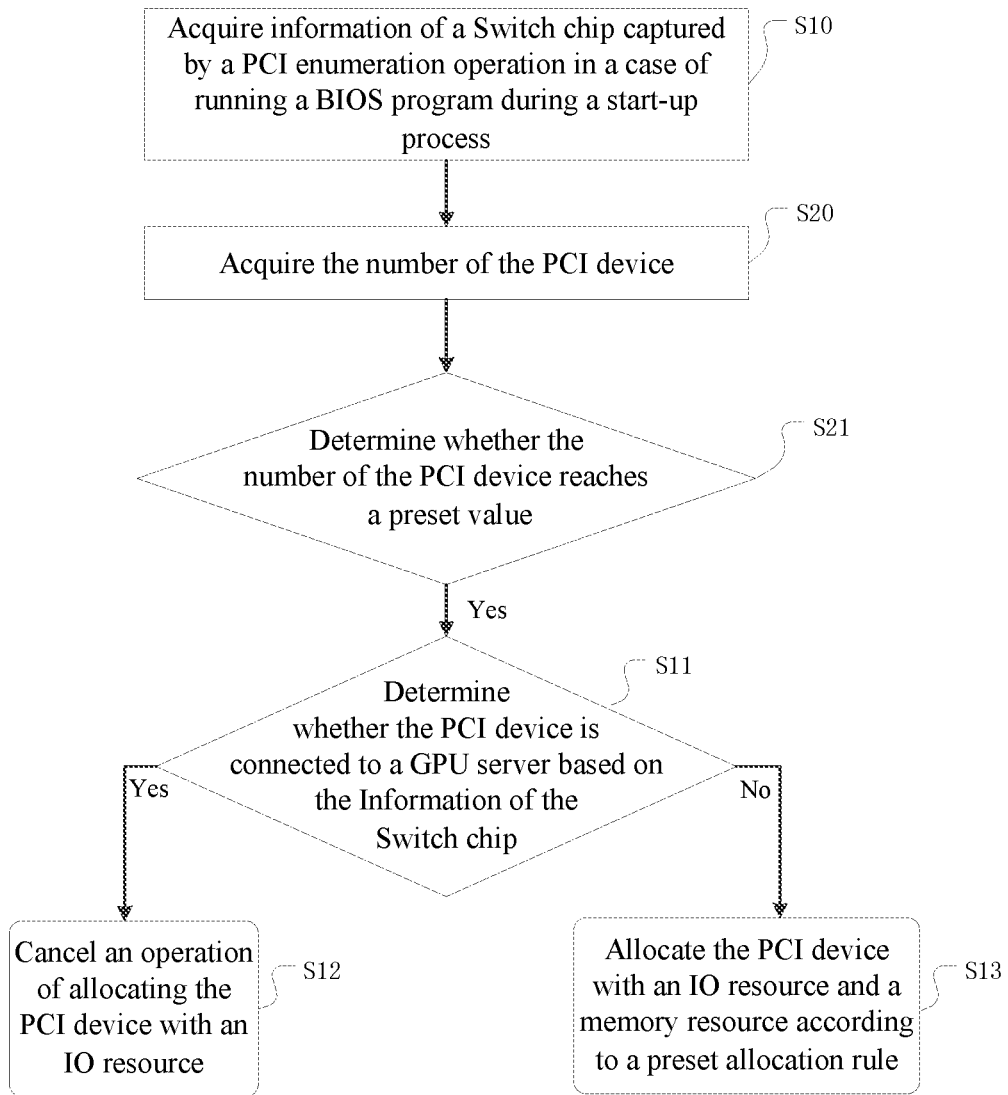
FIG. 2 is a flow chart of a method for allocating a resource based on a type of a PCI device according to another embodiment of the present disclosure.

FIG. 2 is a flow chart of a method for allocating a resource based on a type of a PCI device according to another embodiment of the present disclosure. As shown in FIG. 2, based on the above embodiment, before step S11, the method further includes the following steps S20 and S21.

In step S20, a number of the PCI device is acquired.

In step S21, it is determined that whether the number of the PCI device reaches a preset value. The method proceeds to step S11 in a case that the number of the PCI device reaches the preset value.

It is to be noted that, in a case that there are a large number of the PCI devices, a large amount of IO resources may be required, which may result in a shortage of the IO resource. However, in some practical applications, the number of the PCI device in a system is not so large, for example, there are 8 PCI devices. In this situation, the IO resource is enough for all the PCI devices in the case of running the BIOS program during the start-up process, and the PCI device may be allocated with an IO resource and a memory resource using a conventional method. In other words, it is unnecessary to determine whether the PCI device is connected to the GPU server in this case, and it is only required to determine whether the PCI device is connected to the GPU server in a case that the IO resource is not enough for a large number of the PCI devices.

It is to be understood that, the preset value is set according to actual applications. For example, in the case of running the BIOS program during the start-up process, if there is 64 k of IO resource available and each of the PCI devices is allocated with 4 k of IO resource, the number of the PCI devices is required to be smaller than 16, and in this case, the preset value is 16.

Figure 3:
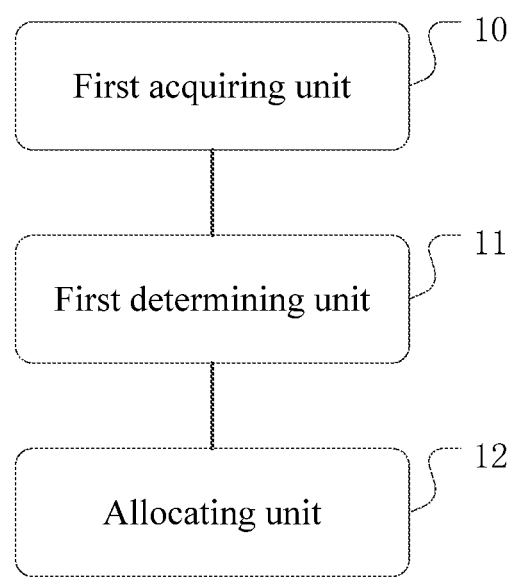
FIG. 3 is a schematic structural diagram of a device for allocating a resource based on a type of a PCI device according to an embodiment of the present disclosure.

The method for allocating a resource based on a type of a PCI device according to the embodiment of the present disclosure is described above. A device for allocating a resource based on a type of a PCI device is further provided according to present disclosure, which corresponds to the method. FIG. 3 is a schematic structural diagram of a device for allocating a resource based on a type of a PCI device according to an embodiment of the present disclosure. As shown in FIG. 3, the device includes a first acquiring unit 10, a first determining unit 11, and an allocating unit 12. The first acquiring unit 10 is configured to acquire information of a Switch chip captured by a PCI enumeration operation in a case of running a BIOS program during a start-up process. The first determining unit 11 is configured to determine whether the PCI device is connected to a GPU server based on the information of the Switch chip. The allocating unit 12 is configured to: cancel an operation of allocating the PCI device with an IO resource in a case that the PCI device is connected to the GPU server, or allocate the PCI device with the IO resource and a memory resource according to a preset allocation rule in a case that the PCI device is not connected to the GPU server.

In an embodiment, the information of the Switch chip includes ID information and version information of the Switch chip. The first determining unit 11 is configured to determine whether there are the ID information of the Switch chip and the version information of the Switch chip; and determine, in a case that there are the ID information and the version information of the Switch chip, that the PCI device is connected to the GPU server.

In an embodiment, the device further includes a second acquiring unit and a second determining unit. The second acquiring unit is configured to acquire the number of the PCT device. The second determining unit is configured to determine whether the number of the PCI device reaches a preset value, and trigger the first determining unit 11 in a case that the number of the PCI device reaches the preset value.

Since the device embodiment corresponds to the method embodiment, description of the device embodiment may be referred to that of the method embodiments, which is not repeated here.

With the device for allocating a resource based on a type of a PCI device according to the present disclosure, in a case of running a BIOS program during a start-up process, information of a Switch chip captured by a PCI enumeration operation is acquired. The reason for performing the method in the case of running the BIOS program during the start-up process is that the IO resource is limited in the case of running the BIOS program, thus the method is used for allocating a resource to a PCI device only in the case of running the BIOS program during the start-up process. It is determined whether the PCI device is connected to a GPU server based on the information of the Switch chip. An operation of allocating the PCI device with an IO resource is cancelled in a case that the PCI device is connected to the GPU server, and the PCI device is allocated with an IO resource and a memory resource based on a preset allocation rule in a case that the PCI device is not connected to the GPU server. In the method, it is determined whether the PCI device is connected to the GPU server based on the information of the Switch chip, to determine whether it is required to allocate the IO resource. Compared with the conventional method for allocating a resource, with the device according to the present disclosure, in a case that the size of the IO resource is limited, an operation of allocating IO resources to certain PCI device may be cancelled, and it is ensured that all the PCI devices operate normally.

A device for allocating a resource based on a type of a PCI device is further provided according to another embodiment of the present disclosure. The device in the above embodiment is described from an aspect of function modules, while the device in this embodiment is described in an aspect of hardware. It is to be understood that, the method is performed via a computer program stored in a memory. The computer program, when executed by a processor, configures the processor to perform the method. The device includes a memory and a processor. The memory is configured to store the computer program. The processor is configured to perform, when execute the computer program, the steps of the method for allocating a resource based on a type of a PCI device as described in the above embodiments.

The device for allocating a resource based on a type of a PCI device according to the embodiment of the present disclosure includes a memory and a processor. The processor may perform, when execute the computer program, the following method. In a case of running a BIOS program during a start-up process, information of a Switch chip captured by a PCI enumeration operation is acquired. The reason for performing the method in the case of running the BIOS program during the start-up process is that the IO resource is limited in the case of running the BIOS program, thus the method is used for allocating a resource to a PCI device only in the case of running the BIOS program during the start-up process. It is determined whether the PCI device is connected to a GPU server based on the information of the Switch chip. An operation of allocating the PCI device with an IO resource is cancelled in a case that the PCI device is connected to the GPU server, and the PCI device is allocated with an IO resource and a memory resource based on a preset allocation rule in a case that the PCI device is not connected to the GPU server. In the method, it is determined whether the PCI device is connected to the GPU server based on the information of the Switch chip, to determine whether it is required to allocate the IO resource. Compared with the conventional method for allocating a resource, with the method according to the present disclosure, in a case that the size of the IO resource is limited, an operation of allocating IO resources to certain PCI device may be cancelled, and it is ensured that all the PCI devices operate normally.

A computer readable storage medium is further provided according to an embodiment of the present disclosure. The computer readable storage medium stores a computer program. The computer program, when executed by a processor, configures the processor to perform the steps of the method for allocating a resource based on a type of a PCI device as described in the above embodiment.

In a case that the function unit described above is implemented in the form of a software functional units and functions as an independent product for sale or use, it may also be stored in a computer readable storage medium. Based on such understandings, the technical solutions or part of the technical solutions disclosed in the present disclosure that makes contributions to the conventional technology or all or a part of the technical solutions may be essentially embodied in the form of a software product. The computer software product may be stored in a storage medium. The computer software product includes a number of instructions that allow a computer device to execute all or part of the steps of the methods provided in the embodiments of the present disclosure. The above storage medium include various mediums capable of storing program code, for example, a U disk, a mobile hard disk, a read only memory (ROM), random access memory (RAM), magnetic disk, or compact disc-read only memory (CD-ROM).

The computer readable storage medium according to the embodiment of the present disclosure is provided to perform the following method. In a case of running a BIOS program during a start-up process, information of a Switch chip captured by a PCI enumeration operation is obtained. The reason for performing the method in the case of running the BIOS program during the start-up process is that the IO resource is limited in the case of running the BIOS program, thus the method is used for allocating a resource to a PCI device only in the case of running the BIOS program during the start-up process. It is determined whether the PCI device is connected to a GPU server based on the information of the Switch chip. An operation of allocating the PCI device with an IO resource is cancelled in a case that the PCI device is connected to the GPU server, and the PCI device is allocated with an IO resource and a memory resource based on a preset allocation rule in a case that the PCI device is not connected to the GPU server. In the method, it is determined whether the PCI device is connected to the GPU server based on the information of the Switch chip, to determine whether it is required to allocate the IO resource. Compared with the conventional method for allocating a resource, with the method according to the present disclosure, in a case that the size of the IO resource is limited, an operation of allocating IO resources to certain PCI device may be cancelled, and it is ensured that all the PCI devices operate normally.

The method, device and medium for allocating a resource based on a type of a PCI device provided according to the present disclosure are described in detail in the above embodiments. The above embodiments in the specification are described in a progressive manner. Each of the embodiments is mainly focused on describing its differences from other embodiments. For the same or similar parts among different embodiments, one may refer to the description of other embodiments. Since the device disclosed in the embodiment corresponds to the method disclosed in the embodiment, the description for the device is simple, and reference may be made to the method in the embodiment for the relevant parts. It should be noted that, for those skilled in the art, many modifications and improvements may be made to the present disclosure without departing from the principle of the present disclosure, and these modifications and improvements are also deemed to fall into the protection scope of the present disclosure defined by the claims.

It should be further noted that, in the specification, the relationship terminologies such as "first", "second" and the like are only used herein to distinguish one entity or operation from another, rather than to necessitate or imply that the actual relationship or order exists between the entities or operations. Further, the term "include", "comprise" or any variant thereof is intended to encompass nonexclusive inclusion so that a process, method, article or device including a series of elements includes not only those elements but also other elements which have not been listed definitely or an element(s) inherent to the process, method, article or device. Moreover, the expression "comprising a(n) . . . " in which an element is defined will not preclude presence of an additional identical element(s) in a process, method, article or device comprising the defined element(s) unless further defined.

The invention claimed is:

1. A method for allocating a resource based on a type of a Peripheral Component Interconnect (PCI) device, comprising steps of:
   acquiring information of a Switch chip captured by a PCI enumeration operation in a case of running a Basic Input/Output System (BIOS) program during a start-up process;
   determining whether the PCI device is connected to a Graphics Processing Unit (GPU) server based on the information of the Switch chip; and
   cancelling an operation of allocating the PCI device with an Input/Output (IO) resource in a case that the PCI device is connected to the GPU server, or allocating the PCI device with the IO resource and a memory resource according to a preset allocation rule in a case that the PCI device is not connected to the GPU server,
   wherein the information of the Switch chip comprises identification (ID) information of the Switch chip and version information of the Switch chip, and
   the step of determining whether the PCI device is connected to the GPU server based on the information of the Switch chip comprises:
      determining whether there are the ID information of the Switch chip and the version information of the Switch chip; and
      determining, in a case that there are the ID information of the Switch chip and the version information of the Switch chip, that the PCI device is connected to the GPU server.

2. The method for allocating a resource based on a type of a PCI device according to claim 1, wherein before the step of determining whether the PCI device is connected to the GPU server based on the information of the Switch chip, the method further comprises:
   acquiring a total number of connected PCI devices; and
   determining whether the total number of the connected PCI devices reaches a preset value, and wherein
   in a case that the total number of the connected PCI devices reaches the preset value, the step of determining whether the PCI device is connected to the GPU server based on the information of the Switch chip is performed.

3. The method for allocating a resource based on a type of a PCI device according to claim 2, wherein the preset value is 16.

4. The method for allocating a resource based on a type of a PCI device according to claim 1, wherein the PCI device is a TitanV graphics card.

5. A device for allocating a resource based on a type of a Peripheral Component Interconnect (PCI) device, comprising:
   a first acquiring unit configured to acquire information of a Switch chip captured by a PCI enumeration operation in a case of running a Basic Input/Output System (BIOS) program during a start-up process;
   a first determining unit configured to determine whether the PCI device is connected to a Graphics Processing Unit (GPU) server based on the information of the Switch chip; and
   an allocating unit configured to: cancel an operation of allocating the PCI device with an Input/Output (IO) resource in a case that the first determining unit determines that the PCI device is connected to the GPU server, or allocate the PCI device with the IO resource and a memory resource according to a preset allocation rule in a case that the first determining unit determines that the PCI device is not connected to the GPU server,
   wherein the information of the Switch chip comprises identification (ID) information of the Switch chip and version information of the Switch chip, and
   the first determining unit is further configured to: determine whether there are the ID information of the Switch chip and the version information of the Switch chip; and determine, in a case that there are the ID information of the Switch chip and the version information of the Switch chip, that the PCI device is connected to the GPU server.

6. The device for allocating a resource based on a type of a PCI device according to claim 5, further comprising:
   a second acquiring unit configured to acquire a total number of connected PCI devices; and
   a second determining unit configured to determine whether the total number of the connected PCI devices reaches a preset value, and trigger the first determining unit in a case that the total number of the connected PCI devices reaches the preset value.

7. A non-transitory computer-readable storage medium, having a computer program stored thereon, wherein
   the computer program, when executed by a processor, configures the processor to perform steps of a method for allocating a resource based on a type of a Peripheral Component Interconnect (PCI) device, wherein
   the method for allocating a resource based on a type of a PCI device comprises the steps of:
      acquiring information of a Switch chip captured by a PCI enumeration operation in a case of running a Basic Input/Output System (BIOS) program during a start-up process;
      determining whether the PCI device is connected to a Graphics Processing Unit (GPU) server based on the information of the Switch chip; and
      cancelling an operation of allocating the PCI device with an Input/Output (IO) resource in a case that the PCI device is connected to the GPU server, or allocating the PCI device with the IO resource and a memory resource according to a preset allocation rule in a case that the PCI device is not connected to the GPU server, wherein the information of the Switch chip comprises identification (ID) information of the Switch chip and version information of the Switch chip, and the step of determining whether the PCI device is connected to the GPU server based on the information of the Switch chip comprises:
- determining whether there are the ID information of the Switch chip and the version information of the Switch chip; and
- determining, in a case that there are the ID information of the Switch chip and the version information of the Switch chip, that the PCI device is connected to the GPU server.

8. The non-transitory computer-readable storage medium according to claim 7, wherein before performing the step of determining whether the PCI device is connected to the GPU server based on the information of the Switch chip, the processor is further configured to perform:
- acquiring a total number of connected PCI devices; and
- determining whether the total number of the connected PCI devices reaches a preset value, and wherein in a case that the total number of the connected PCI devices reaches the preset value, the processor performs the step of determining whether the PCI device is connected to the GPU server based on the information of the Switch chip.

9. The non-transitory computer-readable storage medium according to claim 8, wherein the preset value is 16.

10. The non-transitory computer-readable storage medium according to claim 7, wherein the PCI device is a TitanV graphics card.

* * * * *